United States Patent [19]

Black et al.

[11] Patent Number: 4,705,100

[45] Date of Patent: Nov. 10, 1987

[54] FUEL/AUXILIARY OIL THERMAL MANAGEMENT SYSTEM

[75] Inventors: Stephen J. Black, Huntington Station; Richard Hitzigrath, Sayville; Arnold Rosenblatt, Massapequa Park; Douglas H. Grundy, E. Islip, all of N.Y.

[73] Assignee: Grumman Aerospace Corp., Bethpage, N.Y.

[21] Appl. No.: 884,399

[22] Filed: Jul. 11, 1986

[51] Int. Cl.[4] ............................................. F02C 7/224
[52] U.S. Cl. ........................................ 165/40; 165/41; 60/736; 60/39.83; 123/553
[58] Field of Search ................... 123/553, 557; 165/41, 165/40; 60/39.83, 736

[56] References Cited

U.S. PATENT DOCUMENTS

| | | | |
|---|---|---|---|
| 2,851,863 | 9/1958 | Theed | 60/736 |
| 2,865,580 | 12/1958 | Marshall | 60/39.08 |
| 3,420,055 | 1/1969 | Lavash | 60/736 |
| 4,020,632 | 5/1977 | Coffinberry et al. | 123/553 |
| 4,354,345 | 10/1982 | Dreisbach et al. | 60/736 |

Primary Examiner—Albert W. Davis, Jr.
Attorney, Agent, or Firm—Richard G. Geib; Daniel J. Tick; Bernard S. Hoffman

[57] ABSTRACT

An arrangement that uses aircraft fuel as a heat sink for aircraft auxiliary oil systems for an aircraft having at least one engine operated by fuel and having an engine interface limit and including a fuel/oil heat exchanger for removing heat from the aircraft auxiliary oil systems and having a fuel outlet temperature, a temperature sensing for determining temperature of the fuel leaving the fuel/oil heat exchanger, a recirculating flow control valve having variable positions including an open and a closed position controlled by the temperature sensor, the fuel always going to the aircraft engine but also going through the flow control valve when the flow control valve is in the open position so that recirculation is minimized and maximum heat is rejected to the engine by the fuel outlet temperature of the fuel/oil heat exchanger when the fuel outlet temperature of the fuel-/oil heat exchanger is controlled by the engine interface limit, a ram air heat exchanger for removing heat from the fuel leaving the recirculating flow control valve, and a bypass line disposed across the recirculating flow control valve so as to always provide a small amount of fuel recirculation flow so that possible freezing of stagnant fuel in the ram air heat exchanger is prevented at high altitude when the flow control valve is in the closed position and also the aircraft auxiliary oil systems can be cooled when the engine is not operating and auxiliary systems are powered by ground support equipment.

7 Claims, 8 Drawing Figures

| AIRCRAFT | MAXIMUM RAM AIR TEMPERATURE |
|---|---|
| F-14A | 166°C (330°F) |
| X-29 | 96°C (205°F) |
| A-6 | 84°C (184°F) |

R86-1018-002

| AIRCRAFT | MAXIMUM FUEL INTERFACE TEMP LIMIT |
|---|---|
| X-29 | 79°C (175°F) |
| F-14A | 57°C (135°F)(SS) / 74°C (165°F)(TRANSIENT) |
| F-14D | 93°C (200°F) |
| A-6 | 79°C (175°F) |

R86-1018-003

FUEL/AUXILIARY OIL THERMAL MANAGEMENT SYSTEM

FUEL/AUXILIARY OIL THERMAL MANAGEMENT SYSTEM

BACKGROUND OF THE INVENTION

The present invention relates to a fuel/auxiliary oil thermal management system. More particularly, it relates to a fuel/auxiliary oil thermal management system which includes fuel/oil heat exchanger means, temperature sensing means, recirculating flow control means, and ram air heat exchanger means.

Most aircraft have auxiliary oil systems that require cooling to maintain temperatures within allowable limits. These include hydraulic systems, gearbox oil systems such as the engine gearboxes or airframe mounted accessory gearboxes, and generator oil systems such as Integrated Drive Generators (IDG) or Variable Speed Constant Frequency (VSCF) generators. These systems are usually forced-air-cooled, using compact heat exchangers which require freestream (ram) air brought onboard the aircraft with scoops or other type inlets.

The benefit of this type of system is that the supply of such ram air is unlimited. In addition, some quantity of air is required anyway for compartment and engine nacelle ventilation.

The main disadvantage, however, is that ram air creates drag on the aircraft. This translates directly to aircraft weight and therefore more fuel is required to complete the same mission. Another important consideration is that the temperature of ram air varies over the entire flight envelope (ram air temperature rise over static ambient air temperature is proportional to the square of the aircraft Mach number).

FIG. 1 gives some maximum ram air temperatures seen by a variety of military aircraft in a MIL-STD-210A hot atmosphere (39.4° C. or 103° F. at sea level). Usually the flight conditions where these maximum ram air temperatures are seen are the same as those for which auxiliary oil system heat loads are the highest. Thus, ram air flow rates to cool these systems are often significant. Even with large air flow rates, oil systems temperatures in the air-cooled system can reach levels which are only allowable for short transient periods (during a specific maneuver). In addition, during ground static operation, ram air is not readily available and as such, fans or bleed air ejector systems must be provided.

A fuel-cooled system, on the other hand, takes advantage of the heat capacity of the aircraft fuel already onboard. Other advantages are that fuel/oil heat exchangers are smaller and lighter than similarly rated air/oil heat exchangers, less ram air is required and therefore overall aircraft drag is reduced. Auxiliary oil systems temperatures are lower and more uniform since the fuel heat sink is more uniform. During high speed maneuvers when air-cooled systems run hot, the fuel-cooled auxiliary oil system usually decreases in temperature due to high engine fuel flow rates. This lower operating temperature results in increased system reliability. Fuel flow is available during ground static operation as well, so the need for bleed air ejectors or fans is eliminated.

A disadvantage of this type of system is that the cooling capacity of onboard fuel is not unlimited (as with any expendable cooling system), and recirculation tends to increase aircraft tank fuel temperatures over time. Care must be taken, therefore, in the design of a fuel-cooled system so that for the most severe mission, in the hottest design environment, the subsystem cooling capability is not depleted before the fuel itself is depleted.

SUMMARY OF THE INVENTION

Accordingly, it is an object of the present invention to provide a fuel/auxiliary oil thermal management system that avoids the disadvantages of the prior art.

More particularly, it is an object of the present invention to provide a fuel/auxiliary oil thermal management system which allows efficient use of fuel as a heat sink by controlling the engine interface temperature to the maximum allowable. This technique rejects the maximum amount of subsystem heat to the engine and minimizes the amount of heat returned to the aircraft fuel tanks.

In keeping with these objects, and with others which will become apparent hereinafter, one feature of the present invention resides, briefly stated, in an arrangement that uses aircraft fuel as a heat sink for aircraft auxiliary oil systems for an aircraft having at least one engine operated by fuel and having an engine interface limit and including fuel/oil heat exchanger means for removing heat from the aircraft auxiliary oil systems and having a fuel outlet temperature, temperature sensing means for determining temperature of the fuel leaving the fuel/oil heat exchanger means, recirculating flow control means having variable positions including an open and a closed position controlled by the temperature sensing means and the fuel always going to the aircraft engine but also going through the recirculating flow control means when the recirculating flow control means is in the open position, ram air heat exchanger means for removing heat from the fuel leaving the recirculating flow control means, and wherein bypass means disposed across the recirculating flow control means is provided so as to always allow a small amount of fuel recirculation flow.

When the fuel/auxiliary oil thermal management system is designed in accordance with the present invention, possible freezing of stagnant fuel in the ram air heat exchanger is prevented at high altitude when the recirculating flow control means is in the closed position and also the aircraft auxiliary oil systems can be cooled when the engine is not operating and auxiliary systems are powered by ground support equipment. Additionally, recirculation is minimized and maximum heat is rejected to the engine by the fuel outlet temperature of the fuel/oil heat exchanger means when the fuel outlet temperature of the fuel/oil heat exchanger means is controlled to the engine interface limit.

In accordance with another feature of the present invention the fuel/oil heat exchanger means include a fuel/oil heat exchanger for the aircraft hydraulics system, the Accessory Drive Gearbox, and the Integrated Drive Generator.

Another feature of the present invention is that the temperature sensing means is disposed downstream of the fuel/oil heat exchanger means.

Still another feature of the present invention is that the recirculating flow control means is disposed downstream of the temperature sensing means.

Yet another feature of the present invention is that the ram air heat exchanger means is disposed downstream of the recirculating flow control means.

Still yet another feature of the present invention is that the recirculating flow control means include a recirculating flow control valve.

Finally, still a further feature of the present invention is that it further includes a microprocessor-operated controller which operates the recirculating flow control means as a function of the temperature sensing means.

The novel features which are considered characteristic for the invention are set forth in particular in the appended claims. The invention itself, however, both as to its construction and its method of operation, together with additional objects and advantages thereof, will be best understood from the following description of the specific embodiment when read in connection with the accompanying drawings.

BRIEF DESCRIPTIONS OF THE DRAWINGS

DETAIL DESCRIPTION OF THE PREFERRED EMBODIMENT

Since fuel is the primary heat sink, characterization of its temperature boundaries is of primary importance. Two such values are the maximum predicted initial fuel temperature and the maximum allowable engine inlet fuel temperature.

A maximum allowable engine inlet fuel temperature is imposed since the engine also uses fuel as a heat sink for its gearbox and often for electronic fuel control systems which are fuel-cooled. In addition, engine fuel pumps add heat to the fuel and there are limits as to fuel temperature at the engine nozzles (due to coking considerations). Some typical maximum allowable fuel inlet temperatures are given in FIG. 2.

Obviously, the aircraft designer desires as high an interface temperature as possible. Some compromises must be met, again through integration of the aircraft's cooling system with the engine cooling requirements.

Figures 1, 2, 3:
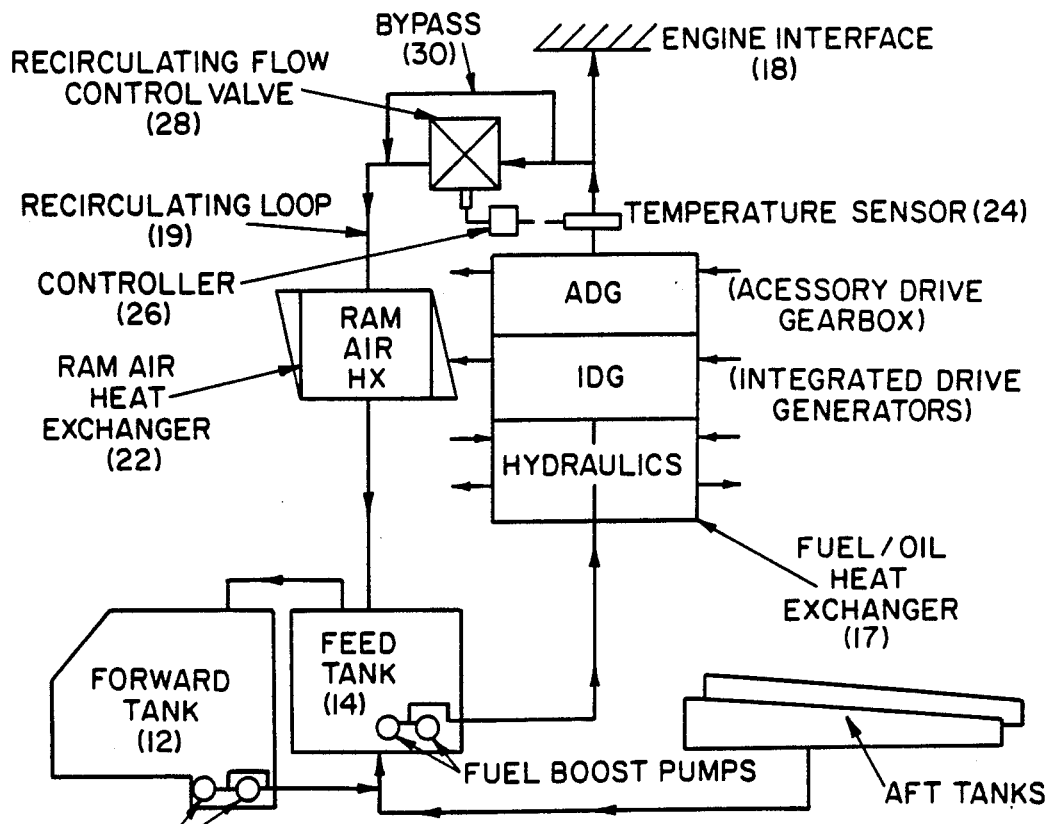
FIG. 1 is a chart showing the maximum ram air temperature for three types of aircraft.
FIG. 2 is a chart showing the typical maximum fuel interface temperature limits.
FIG. 3 is a schematic of the fuel/auxiliary oil thermal management system.

A schematic of the fuel/auxiliary oil thermal management system 10 is shown in FIG. 3 which incorporates a typical generic aircraft fuel tank system. The aircraft has four fuel cells, two large bladder-type cells in the main fuselage (forward 12 and feed 14) and two smaller aft (integral) tanks 16. All tanks transfer into the feed tank 14 which supplies fuel to the engine 18. It should be noted, that other fuel tank arrangements can also be used successfully in the present invention.

On its way to the engine, the fuel is passed through the fuel/oil heat exchanger 17 where the fuel/oil heat exchanger 17 absorbs the auxiliary subsystems heat loads. Since the engine fuel flow is often not high enough to cool the auxiliary loads while not exceeding the engine interface temperature 18 limit, a controlled recirculation loop 19 is added. Recirculation is minimized and the maximum heat is rejected to the engine by controlling the fuel/oil heat exchanger 17 fuel outlet temperature to the engine interface 18 limit.

To reduce the temperature of the returning fuel, a small fuel/air heat exchanger 22 is added downstream of the recirculating flow control valve 28. Location of the ram air scoop in the recirculation line has two advantages over other possible locations. First, since the flow in this recirculation line is less than in the main engine feed line the heat exchanger effectiveness is higher and this feature combined with the fact that this configuration maximizes the amount of heat rejected to ram air and thus, less heat is recirculated back to the fuel tanks. The ram scoop for the heat exchanger 22 is located so that the exhaust air can also serve to ventilate the engine nacelle.

Figure 4:
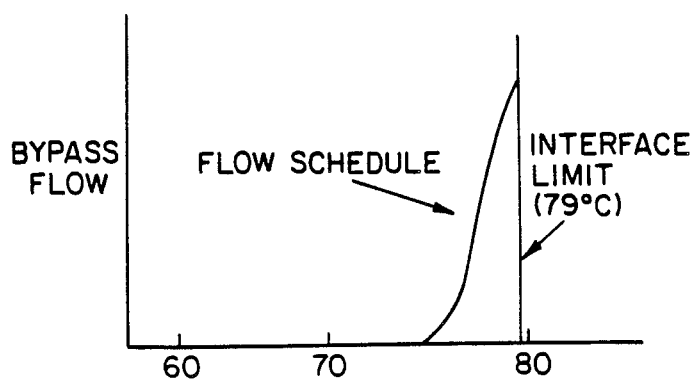
FIG. 4 is a graph of the bypass (recirculation) flow schedule as a function of the sensor temperature.

The control system for recirculation consists of three components: a temperature sensor 24, a microprocessor-operated controller 26, and a recirculating flow control valve 28. The temperature sensor 24 provides a signal to the microprocessor-operated controller 26, which supplies an output current to the recirculating flow control valve 28 as a function of the temperature of the temperature sensor 24. The sensor temperature/bypass flow schedule is shown in FIG. 4.

A fixed bypass 30 around the recirculating flow control valve 28 is incorporated to always provide a small amount of recirculation flow. This prevents possible freezing of stagnant fuel in the fuel/air heat exchanger 22 at high altitude when the recirculating flow control valve 28 is shut. This constant flow is useful for other situations as well. In the event of an engine flameout and loss of fuel flow to the engine, this small flow combined with sustained subsystem heat loads causes the fuel temperature at the temperature sensor 24 to increase rapidly, which opens the recirculating flow control valve 28 to provide cooling to accessories that are being driven by the emergency power system (or the other engine in the case of a multiengine aircraft). It can also enable aircraft systems to be cooled when the engine is not operating and auxiliary systems are powered by ground support equipment.

To increase system safety, a switch is included in the cockpit to remove power to the recirculating flow control valve 28 (driving it wide open). This would allow a safe abort condition providing adequate cooling capability in the event of a thermal control loop malfunction.

ANALYSIS

Because fuel is an expendable heat sink and recirculation results in changes in fuel tank temperatures over time, an analysis of potential design configurations and component sizing analyses (scoops, heat exchangers, etc.) require entire aircraft mission simulation.

Figure 5:
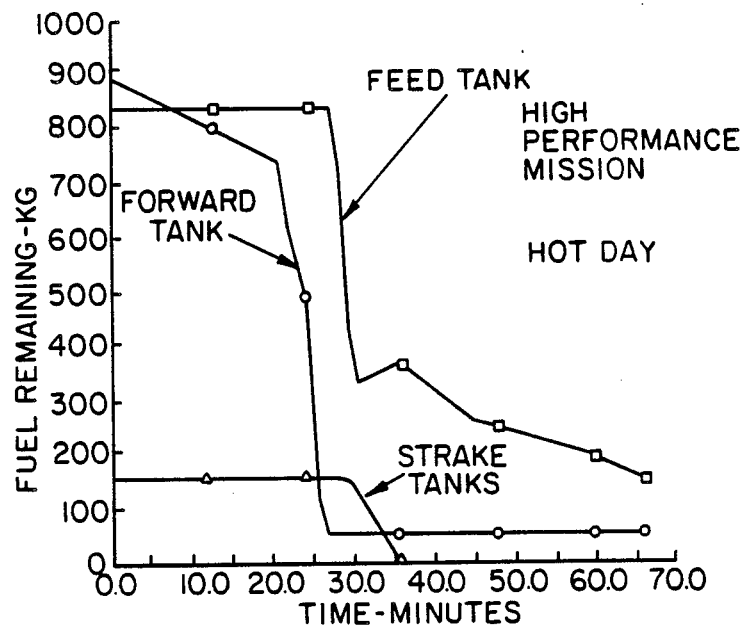
FIG. 5 is a graph of the analytical results of tank weight vs flight time for a design mission.

The results of the transient thermal analysis for a high performance mission are shown in FIGS. 5 to 8. In order to keep track of tank fuel temperatures during the missions, the sequencing of the various tanks transferring and mixing were modeled. FIG. 5 is a plot of the tank sequencing process. The sequencing scheme for the aircraft is very simple. All tanks transfer to the feed tank 14. The forward tank 12 empties first by constantly keeping the feed tank 14 full. When the forward tank 12 is empty, the feed tank 14 starts to empty until approximately ⅓ of its capacity remains. At this point, the aft tanks 16 are transferred into the feed tank 14. For the rest of the mission, engine fuel is drawn from the feed tank 14. It should be noted, that other fuel tank arrangements can also be used successfully in the present invention.

Figure 6:
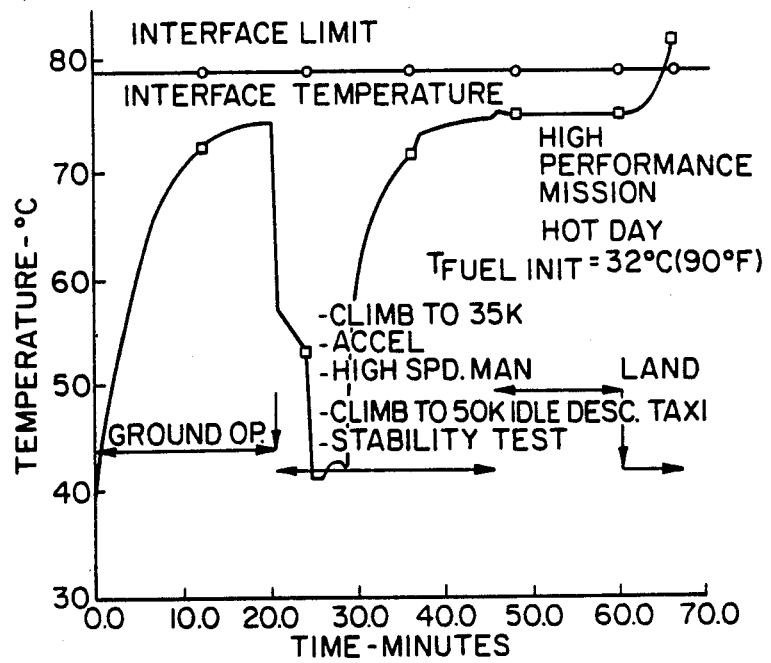
FIG. 6 is a graph of the analytical results of engine interface temperature vs time for the same design mission.

FIG. 6 is a plot of the engine fuel inlet temperature over the duration of the mission. During the first twenty minutes of ground operation, the auxiliary systems begin to heat up and increase the fuel inlet temperature to the point where the recirculating flow control valve 28 opens to control the maximum interface temperature. Then, during takeoff, initial acceleration, and climb maneuvers, extremely high engine fuel flows drive the interface temperature down, and the recirculating flow control valve 28 closes. After engine fuel flows decrease during the high altitude climb and aircraft stability testing phases begin, the temperature begins to climb back up and the recirculating flow control valve 28 opens again. Then, during idle descent, fuel flows are very low. Here again the thermal control system opens up the modulating flow control valve 28 and recirculates fuel to keep the fuel inlet temperature well within the interface limit.

Figure 7:
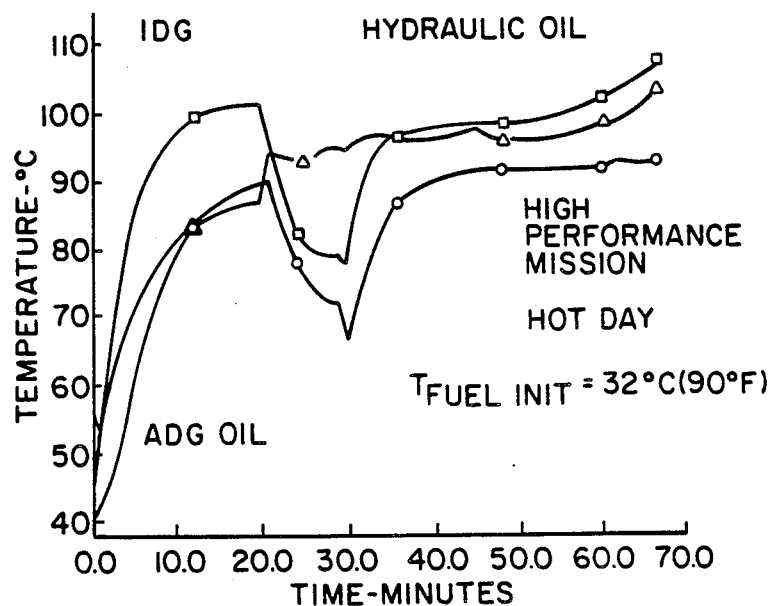
FIG. 7 is a graph of the analytical results of oil systems temperature vs time for the same design mission.

FIG. 7 shows fairly uniform oil systems temperatures throughout the various portions of the mission. Note that during the high speed portion of the mission, oil systems temperatures actually decrease due to the high engine fuel flow rates.

Figure 8:
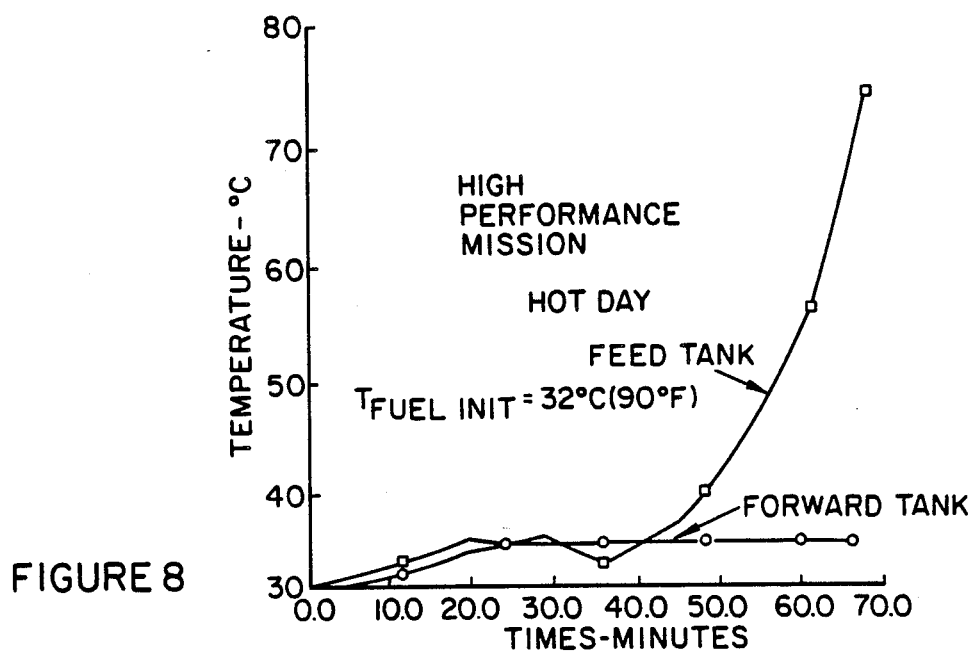
FIG. 8 is a graph of the analytical results of tank temperature vs time for the same design mission.

The bulk temperatures of the fuel tanks are plotted in FIG. 8. The forward tank 12 fuel temperature lags behind the feed tank 14 temperature as expected and its temperature stabilizes once empty. The forward tank 12 temperature decreases when the aft tanks 16 transfer, and then rapidly starts increasing as the quantity of fuel (heat sink) remaining decreases. Recirculation rates become higher since during this section of the mission (idle descent), fuel flow to the engine is low and the tank fuel temperature is increasing.

The successful integration of the fuel/auxiliary oil thermal management system is an indication of the potential of fuel-cooled systems in aircraft design. Fuel systems designers and thermal analysts must always consider the use of aircraft fuel as a heat sink in auxiliary oil systems and even in Environment Control System (ECS) design. Detailed trade studies addressing an "integrated" approach to overall aircraft subsystem cooling determine how many and which systems can be partially or totally fuel-cooled.

The fuel/auxiliary oil thermal management system 10 provides total aircraft accessory oil cooling, including both flight and combined hydraulics, Integrated Drive Generator oil, and Accessory Drive Gearbox oil, with onboard fuel. Fuel cooling rates that are independent of engine demand are achieved through the use of the recirculation loop 19. Recirculation is minimized by maintaining the engine fuel inlet temperature at the maximum allowable. Fuel cooling results in lower, more uniform subsystem oil temperatures, less ram drag, and smaller, lighter-weight heat exchangers.

It will be understood that each of the elements described above, or two or more together, may also find a useful application in other types of constructions differing from the types described above.

While the invention has been illustrated and described as embodied in an fuel/auxiliary oil thermal management system, it is not intended to be limited to the details shown, since various modifications and structural changes may be made without departing in any way from the spirit of the present invention.

We claim:

1. An arrangement that uses aircraft fuel as a heat sink for aircraft auxiliary oil systems for an aircraft having at least one engine operated by fuel and having an engine interface limit, comprising:
   (a) fuel/oil heat exchanger means for removing heat from the aircraft auxiliary oil systems and having a fuel outlet temperature;
   (b) temperature sensing means for determining temperature of the fuel leaving said heat exchanger means;
   (c) recirculating flow control means having variable positions including an open and a closed position controlled by said temperature sensing means, the fuel always going to the aircraft engine but also going through said recirculating flow control means when said recirculating flow control means is in said open position so that recirculation is minimized and maximum heat is rejected to the engine by said fuel outlet temperature of said fuel/oil heat exchanger means when said fuel outlet temperature of said fuel/oil heat exchanger means is controlled to the engine interface limit:
   (d) ram air heat exchanger means for removing heat from the fuel leaving said recirculating flow control means; and
   (e) bypass means disposed across said recirculating flow control means so as to always provide a small amount of fuel recirculation flow so that possible freezing of stagnant fuel in said ram air heat exchanger is prevented at high altitude when said recirculating flow control means is in said closed position and also the aircraft auxiliary oil systems can be cooled when the engine is not operating and auxiliary systems are powered by ground support equipment.

2. An arrangement as defined in claim 1, wherein said heat exchanger means include a heat exchanger for the aircraft hydraulics system, the accessory drive gearbox, and the integrated drive generators.

3. An arrangement as defined in claim 1, wherein said temperature sensing means is disposed downstream of said heat exchanger means.

4. An arrangement as defined in claim 1, wherein said flow control means is disposed downstream of said temperature sensing means.

5. An arrangement as defined in claim 1, wherein said ram air heat exchanger means is disposed downstream of said flow control means.

6. An arrangement as defined in claim 1, wherein said flow control means include a flow control valve.

7. An arrangement as defined in claim 1; further comprising a microprocessor-operated controller which operates said recirculating flow control means as a function of said temperature sensing means.

* * * * *

UNITED STATES PATENT AND TRADEMARK OFFICE
CERTIFICATE OF CORRECTION

PATENT NO. : 4,705,100

DATED : November 10, 1987

INVENTOR(S) : STEPHEN J. BLACK ET AL

It is certified that error appears in the above-identified patent and that said Letters Patent is hereby corrected as shown below:

Col. 1, after line 5, insert the following paragraph:

-- The present invention was made in performance of Contract No. F33615-82-C-3000 with the United States government, which retains a royalty-free license to practice the invention for government purposes. --

Col. 6, line 29 (claim 1), change the colon to semicolon.

Signed and Sealed this

Sixteenth Day of August, 1988

Attest:

DONALD J. QUIGG

*Attesting Officer*        *Commissioner of Patents and Trademarks*